Inventor:
WILHELM LAPPE

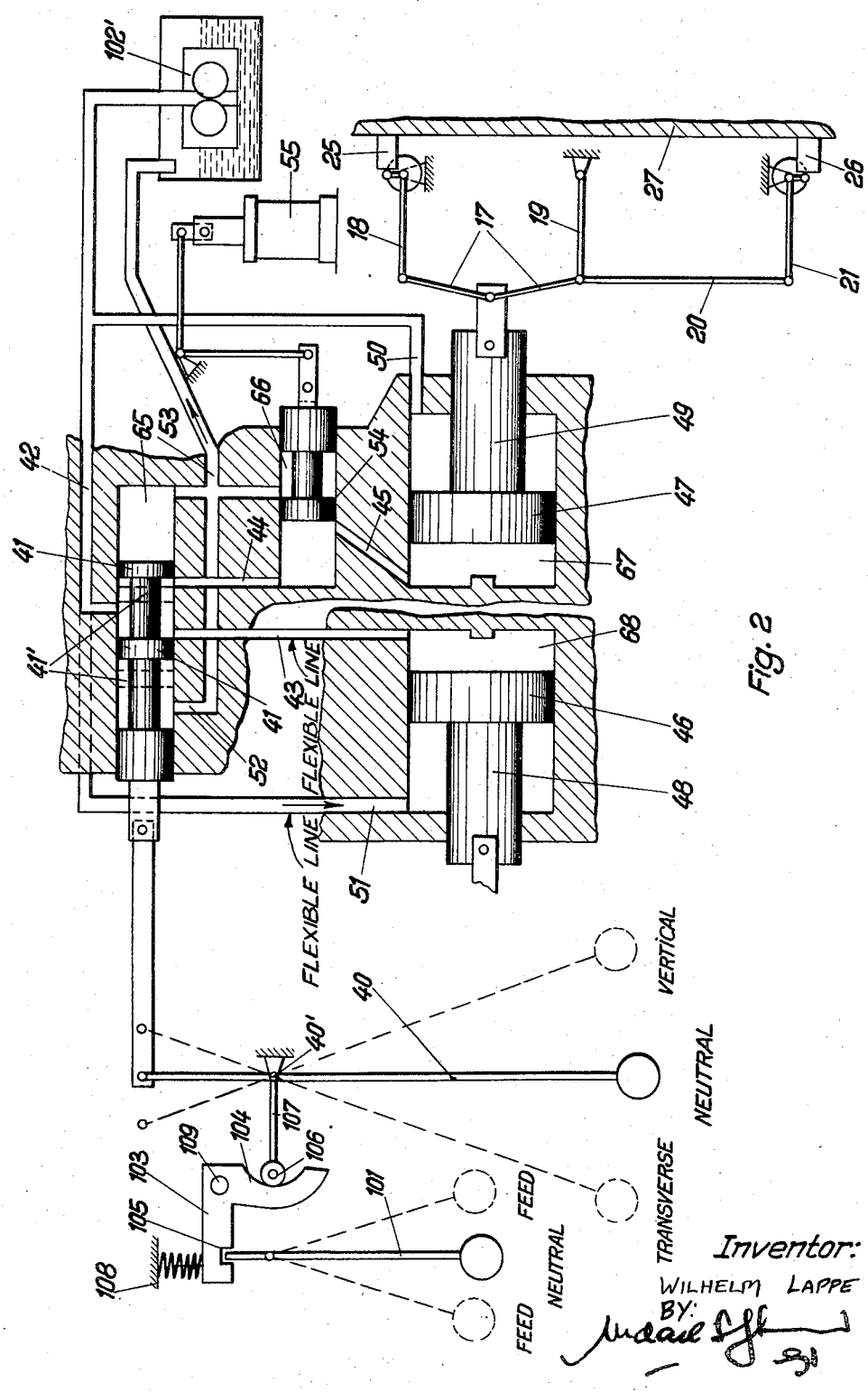

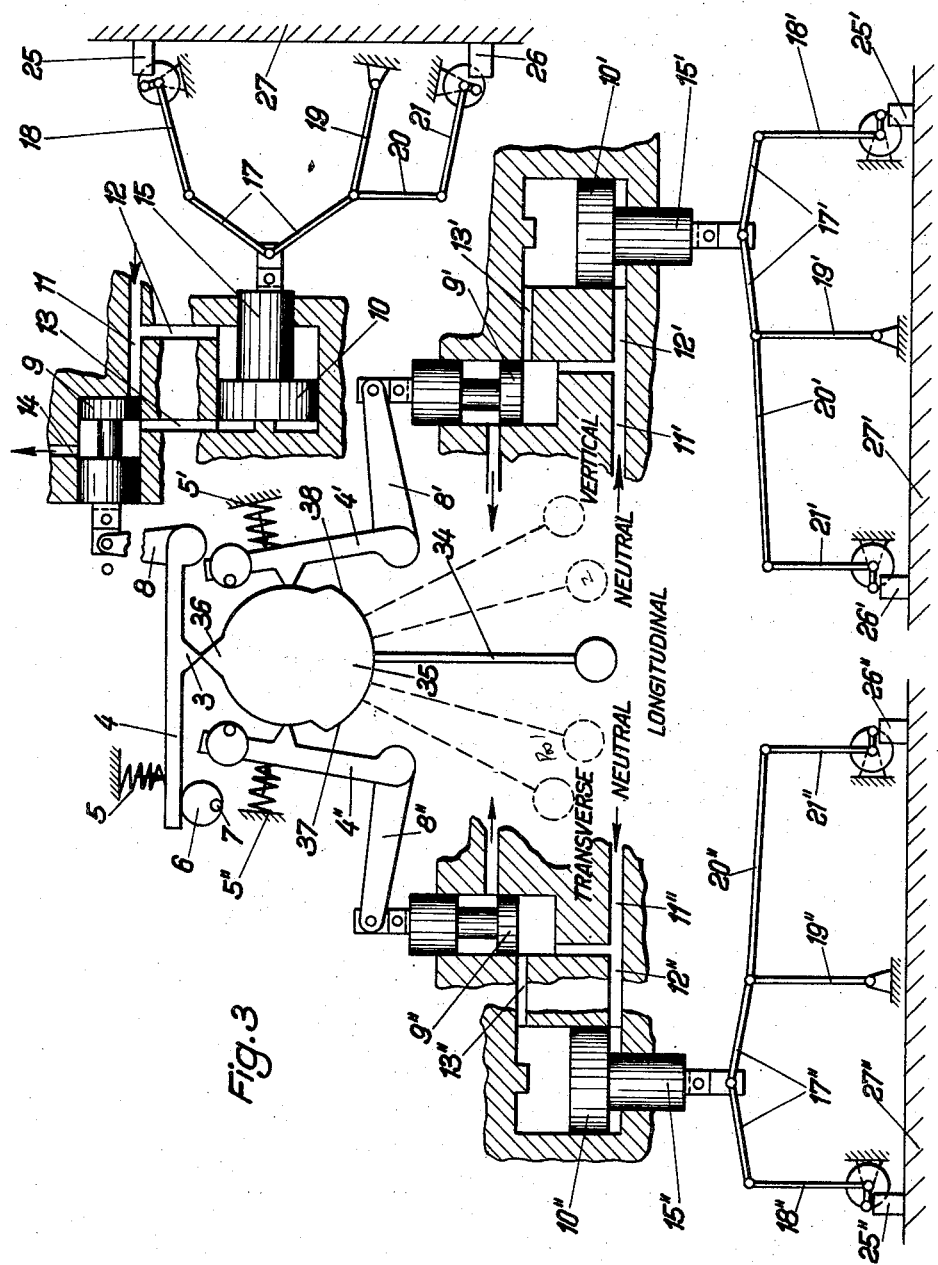

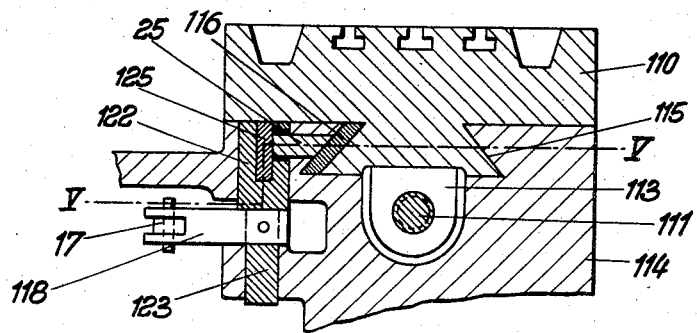
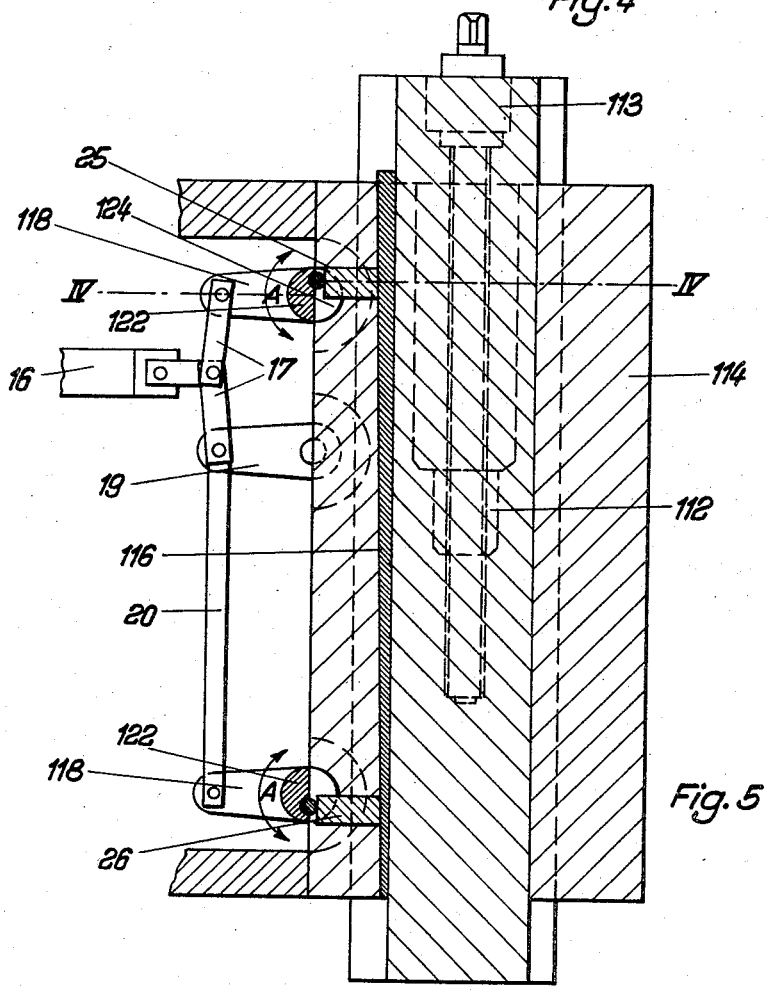

United States Patent Office 2,850,127
Patented Sept. 2, 1958

2,850,127

APPARATUS FOR RELEASABLY LOCKING MACHINE TOOL CARRIAGES AND THE LIKE

Wilhelm Lappe, Berlin-Britz, Germany, assignor to Fritz Werner Aktiengesellschaft, Berlin-Marienfelde, Germany, a firm Application June 30, 1953, Serial No. 365,224

Claims priority, application Germany July 5, 1952

16 Claims. (Cl. 192—2)

The present invention relates to devices such as machine tools.

More particularly, the present invention relates to an apparatus for controlling carriages of machine tools and the like.

One of the objects of the present invention is to provide an apparatus for releasably locking a carriage of a machine tool or the like when the carriage is to be maintained stationary.

Another object of the present invention is to connect such a releasable lock means to a member which controls movement of the carriage in such a way that this member releases the lock means before being moved to the position which causes the carriage to be moved.

A further object of the present invention is to provide a means for preventing movement of a carriage of a machine tool or the like until a releasable lock means therefor is released.

An additional object of the present invention is to provide a plurality of releasable lock means for a plurality of carriages movable in different directions and a control means for releasing only one of the lock means at any one time.

Still another object of the present invention is to provide an independent manually operable means for independently releasing a carriage at any desired time.

With the above objects in view, the present invention mainly consists of a machine tool which includes a plurality of guides for respectively guiding a plurality of carriages in a plurality of different directions, respectively, and a plurality of releasable lock means engaging the plurality of guides, respectively, for releasably locking carriages mounted on the guides for movement therealong. An operating means is movable to a plurality of different positions for respectively setting into operation mechanisms for moving the carriages, respectively; and a control means is operatively connected to the plurality of releasable locking means for releasing only that one of the carriages which is to be moved when the operating means is located in a particular one of its positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic illustration of a part of one possible apparatus constructed in accordance with the present invention and shown associated with a fragmentarily and diagrammatically illustrated guide means for a machine tool carriage;

Fig. 2 schematically illustrates another part of the machine of Fig. 1;

Fig. 3 schematically illustrates another possible construction for acting on a plurality of guides for carriages which are movable in different directions;

Fig. 4 is a fragmentary sectional view showing a carriage and a releasable locking means therefor, Fig. 4 being taken along line IV—IV of Fig. 5;

Fig. 5 is a fragmentary sectional view taken along line V—V of Fig. 4; and

Figure 1:
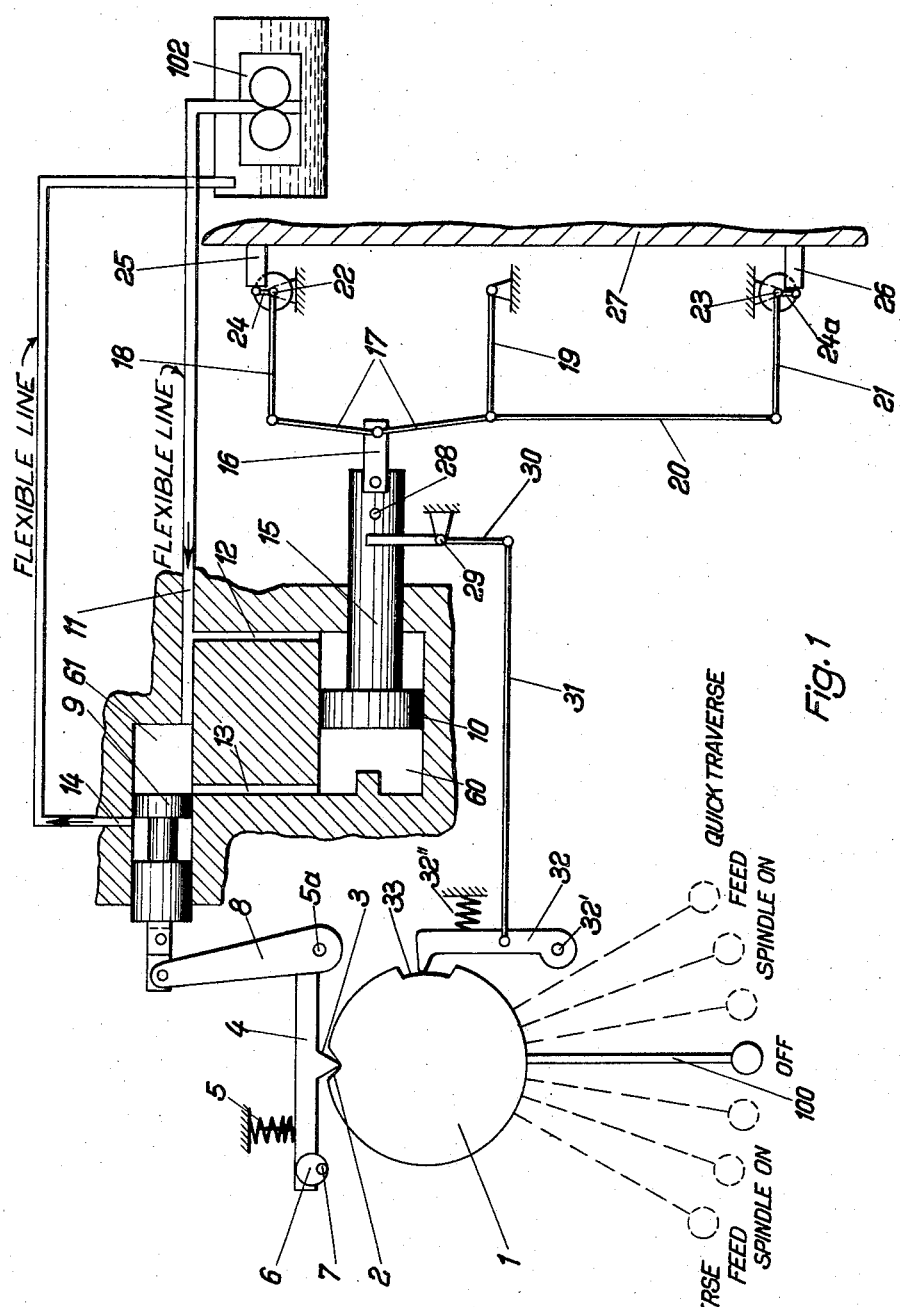

Fig. 1 of the drawings fragmentarily and schematically illustrates a guide 27 for the carriage of a machine tool, this guide being capable of being pressed to a position where it clamps the carriage to lock the latter and prevent movement thereof, and this guide being releasable for freeing the carriage for movement along the guide. A pair of pressure members 25 and 26 engage the guide 27 for transmitting pressure thereto, and a bell crank lever having a long arm 18 and a short arm 24 is turnable about axis 22 to move the free end of short arm 24 toward or away from the member 25 for respectively pressing or releasing same. A similar bell crank having a long arm 21 and a short arm 24a is turnable about axis 23 for moving the free end of short arm 24a toward or away from the member 26 to press against or release the latter, respectively.

The free end of one arm of a toggle linkage 17 is pivotally connected to the free end of arm 18, and the free end of the other arm of toggle linkage 17 is pivotally connected to the free end of a linkage 19 which is pivotally supported at its right end, as viewed in Fig. 1, for movement about an axis parallel to axes 22 and 23. The left end of link 19, as viewed in Fig. 1, is further pivotally connected to one end of a link 20 whose opposite end is pivotaly connected to the free end of arm 21. The pivotally connected arms of toggle linkage 17 are mounted on a member 16 which is fixed to the piston rod 15 of a piston 10 which is supported in a cylinder 60 for reciprocating movement therein, as shown in Fig. 1.

The fluid guiding lines 11, 12, and 13 guide pressure fluid to and from the cylinder 60 to opposite sides of piston 10, and the lines 11 and 13 communicate with a cylinder 61 in which a slide valve 9 is mounted for covering and uncovering the open end of line 13 which communicates with the cylinder 61. A fluid discharge line 14 leads from cylinder 61 to a tank or the like which supplies fluid to a gear pump 102 the pressure side of which communicates with line 11 for feeding fluid under pressure thereto.

The slide valve 9 is pivotally connected to the arm 8 of a bell crank lever which is turnable on the apparatus about the axis 5a, and the other arm 4 of this bell crank lever is provided with a projection 3. A cam 1 which is turnable about its axis on the machine is provided with a notch 2 in which the projection 3 is located with the parts in the position shown in Fig. 1, and a spring 5 engages arm 4 of bell crank lever 4, 8 to urge projection 3 into notch 2 and to urge the bell crank lever 4, 8 and slide valve 9 to the position shown in Fig. 1.

A manually turnable disc 6, which is mounted for rotation about its axis on the apparatus, carries an eccentrically located pin 7 which extends beneath the left end of lever arm 4, in the position of the parts shown in Fig. 1, so that when this disc 6 is turned the pin 7 will engage the lever arm 4 and turn the bell crank 4, 8 in a clockwise direction, as viewed in Fig. 1.

The cam 1 is provided with a second somewhat elongated notch 33 into which a pawl 32 extends, this pawl 32 being mounted on the apparatus for rotation about axis 32'. A spring 32" urges pawl 32 into notch 33. A link 31 is pivotally connected at one end to the pawl 32 and is pivotally connected at its opposite end to the lever 30 which is mounted on the machine for turning movement about axis 29 located between its ends, this lever 30 having a top free end portion, as viewed in Fig. 1, which is located in the path of movement of a pin 28 fixed to the piston rod 15.

A control member in the form of a lever 100 is provided in a known way for controlling the movement of the carriage which moves along guide 27, this control member being turnable in opposite directions to start the rotation of the spindle of the machine and to respectively move the carriage in different directions. This lever 100 is connected to the cam 1 to turn the latter, and the lever 100 is shown in solid lines in Fig. 1 in the "off" position where the machine is at rest. Fig. 1 shows in dotted lines the right and left positions of lever 100 at which the spindle starts rotating, the carriage moves, and where the movement of the carriage is accelerated, these latter three positions being indicated by the "spindle on," "feed," and "quick traverse" designations of Fig. 1.

The structure of Fig. 1 is illustrated in the position where the pressure members 25 and 26 are pressed against the guide means 27 to releasably lock a carriage guided thereby. When the switch (not shown) of the machine is turned on, the pump 102 operates to automatically maintain the parts in the position shown in Fig. 1. In this position of the parts the spring 5 maintains the projection 3 of arm 4 of bell crank 4, 8 in the notch 2 of the cam 1 so that the slide valve 9 is in its leftmost position shown in Fig. 1 where the supply line 11 connected with the pressure side of pump 102 communicates with the lines 12 and 13 to direct fluid under pressure to the interior of cylinder 60 on both sides of piston 10.

Inasmuch as the left side of piston 10, as viewed in Fig. 1, has a greater area than the right side thereof, the total pressure at the left side of piston 10 is greater than the total pressure on the right side of piston 10, and therefore piston 10 moves to the right, as viewed in Fig. 1, to move members 15 and 16 to the right so as to cause the arms 24 and 24a to press against the pressure members 25 and 26 and lock the carriage on the guide 27. This carriage is adapted to be moved in different directions depending on whether the operating member 100 is moved to the left or right as viewed in Fig. 1. Irrespective of the direction in which the operating member 100 is moved, it is evident that the spindle of the machine tool will be set into operation together with turning of the cam 1 through the relatively short distance required to move the projection 3 out of the notch 4 so as to turn the bell crank 4, 8 in a clockwise direction, as viewed in Fig. 1, about the axis 5a.

This movement of bell crank lever 4, 8 moves the slide valve 9 to the right as viewed in Fig. 1, so that the line 13 communicates through the cylinder 61 with the outlet line 14 leading to the suction side of the pump 102. In this way, the pressure at the left side of piston 10, as viewed in Fig. 1, is released while fluid under pressure still communicates with the pressure line 11 through the line 12. Thus, the pressure at the right side of piston 10, as viewed in Fig. 1 becomes greater than that at the left side of piston 10, and the piston then moves to the left, as viewed in Fig. 1, together with the piston rod 15 and member 16 so as to turn the arms 24 and 24a respectively away from the pressure members 25 and 26 to release a carriage guided by the guide 27.

It will be noted that all of this takes place when the operating member 100 has been moved to one of the "spindle on" positions. The pawl 32 is still maintained in the notch 33, however, and the cooperation of this pawl with the notch 33 prevents the cam 1 and operating member 100 therewith from being turned through an angle sufficient to locate the operating member 100 in one of the feed positions at which a mechanism is set into operation to feed the carriage. As the piston 10 and piston rod 15 move to the left, as viewed in Fig. 1, during unlocking of a carriage on guide 27, the pin 28 mounted on piston rod 15 engages the two-arm lever 30 to turn the latter in a counterclockwise direction, as viewed in Fig. 1, about the axis 29 so as to move rod 31 to the right, as viewed in Fig. 1, to thereby turn the pawl 32 in a clockwise direction, as viewed in Fig. 1, against the action of spring 32″ out of the notch 33 so that the cam 1 is freed to allow the operating member 100 to turn to one of the feed positions. The parts are so dimensioned that the pin 28 does not turn the lever 30 through a distance sufficient to release cam 1 until the carriage is completely unlocked so that with the apparatus of Fig. 1 it is impossible to set into operation the mechanism for feeding the carriage until after the carriage is unlocked.

As is evident from Fig. 1 the operating member 100 may be turned to a "quick traverse" position where the carriage may be rapidly moved. When it is desired to stop the carriage, the operating member 100 is turned back to the "off" position shown in Fig. 1 where the slide valve 9 again interrupts the communication between lines 13 and 14 so that the parts again automatically assume the position shown in Fig. 1 where the carriage is automatically locked and maintained locked.

Upon manual turning of the member 6 about its axis, the pin 7 will engage the arm 4 to independently turn bell crank 4, 8 in a clockwise direction about pivot 5a, as viewed in Fig. 1, against the action of spring 5, so that with the apparatus of Fig. 1 it is possible to independently move piston 9 to the right to provide communication between lines 13 and 14 so as to release the pressure from the left side of piston 10 and unlock the carriage at will.

If desired, the linkage 17—21 may be arranged to lock the carriage upon movement of piston 10 to the left rather than to the right, as viewed in Fig. 1, and the slide valve and remaining parts may be changed accordingly, so that the invention is not necessarily limited to movement of the piston 10 in a particular direction and to the particular linkage arrangement shown in Fig. 1.

As was mentioned above, Fig. 1 illustrates only one of the carriages of a machine tool, such as for example the top one of three carriages which is adapted to move longitudinally of the machine tool. As is well known, this top carriage is itself supported by a second carriage movable transversely of the machine tool, and this second carriage is carried by a third carriage movable vertically on the machine tool. Thus, all parts shown in Fig. 1, with the exception of the gear pump 102, are mounted on the transversely movable carriage for movement therewith and communicate with the gear pump 102 through flexible lines 11 and 14. Pivot 29 and lever 30 are also mounted on the transversely movable carriage and the pivoted connections at the opposite ends of rod 31 prevent movement of pawl 32 during movement of the transversely movable carriage.

Apparatus for controlling the movement of the other two carriages of the machine tool which are not shown in Fig. 1, is diagrammatically and fragmentarily illustrated in Fig. 2 where the pump 102′ directs fluid under pressure through the line 42 connected to the pressure side of this pump. This line 42 communicates with lines 50 and 51 and with a cylinder 65 in which the slide valve member 41 reciprocates, the lines 43 and 44 also communicating with this cylinder 65, and lines 43 and 51 being flexible. In addition a line 52 communicates with the cylinder 65 and with an outlet line 53 leading to the suction side of the pump 102′. The line 52 is located behind the lines 43 and 44, as viewed in Fig. 2. The lines 44 and 53 communicate with another cylinder 66 in which a slide valve 54 is located, this slide valve 54 being operatively connected to an independently operable electromagnetic or hydraulic device 55 for independently moving the slide valve 54 within the cylinder 66.

A line 45 communicates with the cylinder 66 and leads from the latter to a cylinder 67 in which a piston 47 identical with piston 10 reciprocates, this piston 47 being connected to a piston rod 49 which is in turn connected to a linkage 17—21 identical with the linkage of Fig. 1 for actuating the pressure members 25 and 26 to releasably lock a second vertically movable carriage guided on the guide 27 of the stationary machine base and being identical with guide 27 of Fig. 1 and cooperating with members 25 and 26 in the same way. The flexible line 43 communicates with a cylinder 68 in which a piston 46 reciprocates, this piston being connected to a piston rod 48 which is in turn connected to a third linkage identical with linkage 17—21 and not shown in Fig. 2 and which cooperates with additional pressure members 25 and 26 identical with those illustrated in Figs. 1 and 2 for releasably locking a third transversely movable carriage. The piston 46 is reciprocated to releasably lock the second transversely movable carriage which supports the carriage of Fig. 1 for longitudinal movement, and the piston 47 is reciprocated to releasably lock the third carriage which is vertically movable and which carries the carriage which is locked and unlocked by movement of piston 46. As was mentioned above, the releasable lock means of Fig. 1, is carried by the transversely movable carriage, and the releasable lock means for the latter, up to flexible lines 43 and 51, is carried by the vertically movable carriage, the releasable lock means for the latter being located in the stationary base of the machine.

With the structure of Fig. 1 a single operating member 100 is provided to control the movement of the carriage as well as to lock and unlock the same. With the structure of Fig. 2, however, which together with the structure of Fig. 1 forms part of the same machine, a separate operating member 40 is provided to selectively lock and unlock the carriages associated with the pistons 46 and 47, said member 40 selecting at the same time, in a manner well known for machine tools especially milling machines, the direction of movement of the carriage concerned, i. e. transverse or vertical, and an operating member 101 independent of member 40 is provided to control the movement of the carriages within the direction preselected by member 40. This member 101 is movable to the left or right, as viewed in Fig. 2, to respectively set into operation mechanisms for moving the carriages associated with the pistons 46 and 47. The lever 101 is movable about an axis located in the plane on which Fig. 2 is taken to set into operation the mechanism for driving the spindle, and therefore these latter positions of member 101 are not shown in Fig. 2.

The lever 40 is turnable about a stationary axis 40' and is directly connected to the slide valve member 41 for reciprocating the latter. In order to prevent movement of operating member 101 to the position where the mechanism for feeding the carriages is set into operation, this lever 101 has its top free end located in a notch 105 of arm 103 of a bell crank 103, 104, when the lever 101 is in the neutral position shown in Fig. 2. This bell crank 103, 104 is turnable about the stationary pivot 109 and is urged in a counterclockwise direction about pivot 109 by the spring 108. An arm 107 is fixed to the lever 40 for turning movement therewith and carries, at its left free end as viewed in Fig. 2, a roller 106 which engages an arcuate surface portion formed on arm 104, this arcuate surface portion being formed along a radius smaller than arm 107 and having its center of curvature located to the left of pivot 40', as viewed in Fig. 2.

When the structure of Fig. 2 is in the position illustrated, both of the carriages are locked. The fluid under pressure flows from the line 42 through the cylinder 65 to the lines 43 and 44 and from the flexible line 43 to the right side of piston 46 in cylinder 68 which maintains this piston 46 in its illustrated left position for locking the transversely movable carriage associated with piston 46. The fluid under pressure also communicates through flexible line 51 with the left side of piston 46, as viewed in Fig. 2, but since the area at the right side of piston 46 is greater, this piston 46 is maintained in its left locking position in the same way as the piston 10 described above is maintained in its locking position.

The fluid from line 44 flows through cylinder 66 and line 45 to become located at the left side of piston 47, and fluid under pressure also flows through line 50 to become located at the right side of piston 47, as viewed in Fig. 2. Here again, since the area of piston 47 is greater at its left side, as viewed in Fig. 2, this piston 47 is maintained by the fluid under pressure in its right locking position shown in Fig. 2.

Assuming now that the lever 40 is turned in a counterclockwise direction about axis 40' to the "vertical" position shown in dotted lines in Fig. 2, it will be seen that the slide valve 41 is moved to the left to the dotted line position 41'. Thus, the pressure fluid in the flexible lines 51 and 43 is not disturbed so that the piston 46 remains in its locking position and thus the transversely movable carriage remains locked. However, the line 44, which communicates with cylinder 67 through the cylinder 66 and line 45, no longer communicates with the pressure line 42. Instead the line 44 now communicates through the right hand portion of cylinder 65, as viewed in Fig. 2, with the outlet line 53 which communicates with the suction side of pump 102' so that the pressure on the left side of piston 47 is released, and since the right hand side of piston 47 communicates through line 50 with the pressure line 42, the piston 47 moves to the left, as viewed in Fig. 2, so as to turn the bell cranks 18 and 21 away from the pressure members 25 and 26 to release the vertically movable carriage guided by the guide 27 shown in Fig. 2. When the lever 40 is returned to the neutral solid line position the parts again assume the position shown in Fig. 2 where both the vertical and transverse carriages are locked.

If the lever 40 is turned in a clockwise direction, as viewed in Fig. 2, to the dotted line "transverse" position, the slide valve 41 moves to the right so as to interrupt the communication between the lines 43 and 42 while maintaining the communication between the lines 42 and 44 so that the piston 47 is not affected. The line 43 now communicates through an intermediate portion of cylinder 65 with the line 52 which communicates with the outlet line 53 so that the fluid pressure at the right hand side of piston 46, as viewed in Fig. 2, is released. The fluid pressure from line 42 still communicates through line 51 with the left hand side of piston 46, as viewed in Fig. 2, so that the piston 46 moves to the right, as viewed in Fig. 2, to release the transversely movable carriage in the same way as the vertically movable carriage associated with piston 47 is released and in the same way that the longitudinally movable carriage associated with piston 10 is released.

The electromagnetic or hydraulic device 55 may be independently actuated through any suitable switch or the like (not shown), which is engaged, for example, by a stop on the vertically movable carriage, to move the slide valve 54 to the left, as viewed in Fig. 2, so as to place line 45 in communication through the cylinder 66 with the outlet line 53. In this way it is possible to independently release the pressure from the left side of piston 47 so that the pressure on the right side thereof will move the piston 47 to the left, as viewed in Fig. 2, to independently release the vertically movable carriage. In the same way a similar device (not shown) may be provided to communicate with line 43 for independently releasing piston 46 to the pressure on the left side thereof, as viewed in Fig. 2, so as to independently release the transversely movable carriage.

The location of the top free end of lever 101 in the notch 105 prevents movement of the lever 101 to either of the feed positions shown in dotted lines as long as the lever 40 is in the indicated neutral position thereof where both the vertically and transversely movable carriages are locked. Thus, it is impossible to move lever 101 to set into operation the mechanisms for feeding the carriages as long as these carriages are locked. The turning of lever 40 in either direction about axis 40' causes roller 106 to engage arm 104 of bell crank 103, 104 to turn this bell crank in a clockwise direction about pivot 109, as viewed in Fig. 2, against the action of spring 108 so as to move the notch 105 above the free top end of lever 101 so as to free the latter for movement only when one of the carriages has been unlocked.

The above-described machine of Figs. 1 and 2 includes the lever 100 shown in Fig. 1 for locking and unlocking as well as controlling the movement of the longitudinal carriage, the lever 40 for locking and unlocking the transversely and vertically movable carriages, and the lever 101 for controlling the movement of these latter carriages. Fig. 3 fragmentarily and diagrammatically illustrates an embodiment of the invention wherein all three carriages may have locking and unlocking thereof as well as the movement thereof controlled by a single operating member 34 which is shown in solid lines in Fig. 3 in the position where the longitudinally movable carriage associated with the guide means 27 is freed and moved, the structure of Fig. 3 for controlling the locking and unlocking of the longitudinally movable carriages being identical with that of Fig. 1, except for the shape of the cam, and being designated by the same reference characters. In Fig. 3 these parts which are identical with the structure of Fig. 1 are shown in the released position where the pressure members 25 and 26 are freed and where the slide valve 9 is located at its right-handmost position and where the piston 10 is located at its left-handmost position.

The manual release means 6, 7 is also identical with that of Fig. 1, but the limiting means 29—32 is omitted and the cam 1 is replaced by a cam 35 having a projection 36 which engages projection 3 of arm 4 of bell crank 4, 8 to turn this bell crank for locating the slide valve 9 in the right-handmost position thereof shown in Fig. 3. Upon turning of the operating member 34 and the cam 35 therewith in a clockwise or counterclockwise direction, the projection 36 will become located beside the projection 3 and the spring 5 will turn the bell crank 4, 8 to automatically lock the longitudinally movable carriage.

As is shown in Fig. 3, there are two neutral positions of operating member 34, on either side of the solid line position thereof, where all three carriages are locked. If the operating member 34 is turned in a counterclockwise direction, as viewed in Fig. 3, through a neutral position to the "vertical" position indicated in dotted lines, the cam portion 38 will engage the projection of bell crank 4', 8' to turn this bell crank against the action of spring 5' for moving the slide valve 9' downwardly, as viewed in Fig. 3, to release the vertically movable carriage which is released and locked by structure identical with that for releasing and locking the longitudinally movable carriage and indicated with the same reference characters primed.

On the other hand, if the operating member 34 and cam 35 therewith are turned in a clockwise direction, as viewed in Fig. 3, through the neutral position to the "transverse" position, the cam portion 37 of cam 35 will engage the projection on arm 4" of bell crank 4", 8" to turn this bell crank in a counterclockwise direction, as viewed in Fig. 3, against the action of spring 5" to move the slide valve 9" downwardly, as viewed in Fig. 3, to release the transversely movable carriage, this structure for locking and releasing the transversely movable carriage being identical with the structures of Fig. 3 for moving the longitudinal and vertically movable carriages and being indicated with the same reference characters double primed. Thus, the structure of Fig. 3 is capable of locking all carriages and releasing only a particular one of the carriages with a single cam and operating member.

Figure 6:
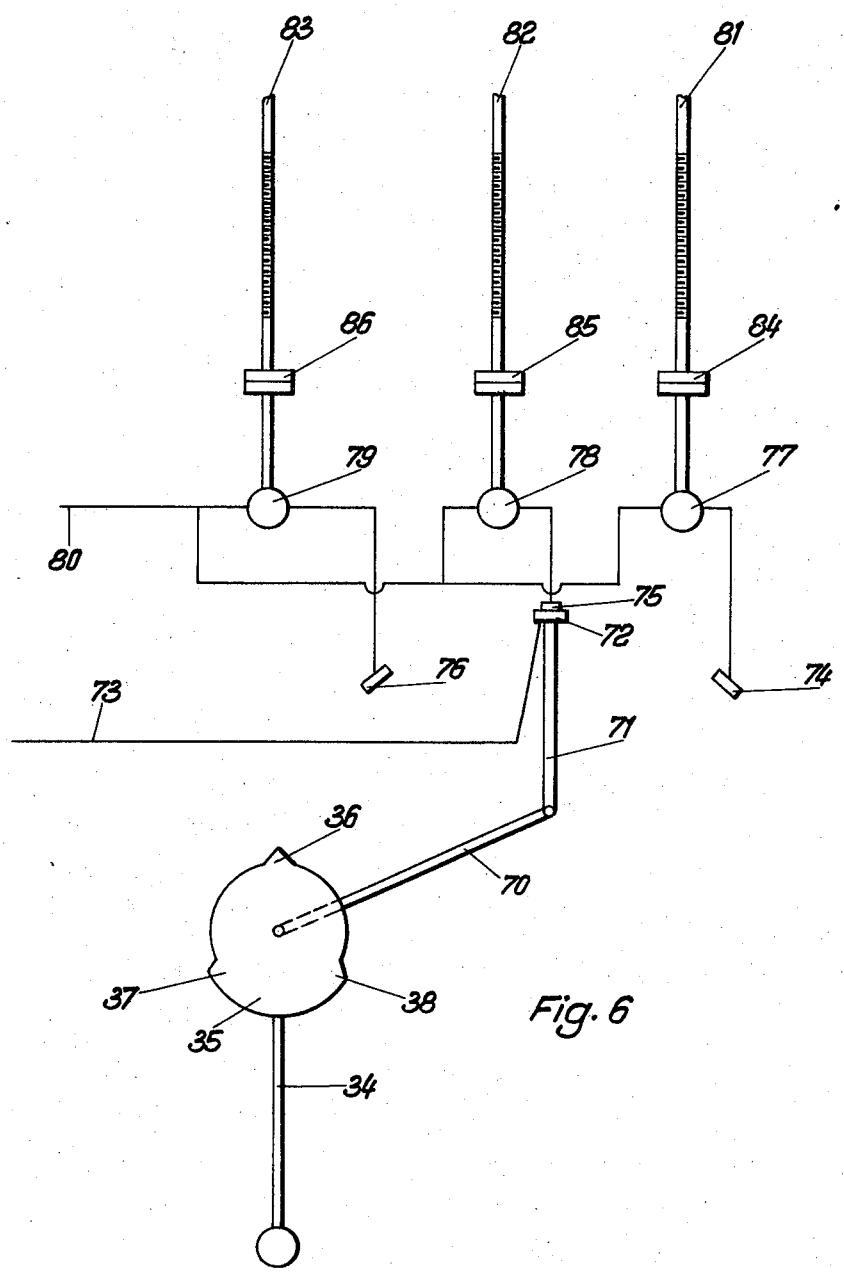
Fig. 6 is a fragmentary diagrammatic illustration of structure for setting into operation mechanisms for moving different carriages of a machine tool.

As is shown in Fig. 6 the cam 35 is fixed to a shaft 70 which is turnable about its own axis and which is fixed to an arm 71 carrying a switch 72 connected to one of the mains 73, this switch member 72 being adapted to contact the switch members 74, 75, 76 for respectively setting into operation the motors 77, 78, and 79 which are connected to the other of the mains 80 and to the switch members 74—76, as shown. The motors 77—79 are respectively connected to the screw spindles 81—83 which are turnable to respectively move the transversely movable carriage, the longitudinally movable carriage, and the vertically movable carriage. Slip clutches 84—86 are respectively located between the connections from the motors 77—79 to the screw spindles 81—83. The cam 35 and operating member 34 are shown in Fig. 6 in the position where the cam portion 36 has raised the arm 4 to release the longitudinally movable carriage and it will be seen that the switch member 72 contacts the switch member 75 to close the circuit through the motor 78 to set the latter into operation for turning the spindle 82 through the slip clutch 85. This slip clutch prevents turning of the spindle 82 until the longitudinally movable carriage is unlocked. In the same way, when the cam portion 38 engages the projection of arm 4' to release the vertically movable carriage, the switch member 72 engages switch member 76 to close the circuit through motor 79 for turning spindle 83 through slip clutch 86, and also when the cam portion 37 engages the projection of arm 4" to release the transversely movable carriage, the switch member 72 engages the switch member 74 to complete the circuit through the motor 77 for turning the spindle 81 through the slip clutch 84 so as to move the transversely movable carriage after it is unlocked. Thus, the structures of Figs. 3 and 6, are capable of moving as well as locking and unlocking any one of the three carriages with a single operating member 34.

It is to be understood that a structure similar to that shown in Fig. 6 may be associated with the cam 1 and lever 100 of Fig. 1 for driving the longitudinally movable carriage associated with the structure of Fig. 1 simply by turning movement of the arm 100, and if desired the levers 40 and 101 of Fig. 2 may be combined into a single lever as shown in Fig. 3. Also, the structure of Fig. 3 may be arranged similarly to the structure of Fig. 2 to include separate levers for locking and unlocking the carriages and for controlling the movement thereof.

Figs. 4 and 5 show the details of one possible construction for releasably locking any one of the above-described carriages. As is shown in Fig. 4, a carriage 110, corresponding to any one of the above carriages, is movable in the illustrated example of the stationary base 114, although the structures of Figs. 4 and 5 may be associated with any one of the above-mentioned carriages. As is shown in Fig. 4, the base 114 is provided with a dove-tailed guide 115 for the carriage 110, and a wedge-shaped strip 116 engages one face of the dove-tailed guide and the carriage, this strip 116 being longitudinally adjustable to take up wear in the ways of the machine tool, as is well known. The pressure members 25 and 26 are shown as being slidably mounted in suitable bores of the base 114 to engage the strip 116. A thread spindle 111 corresponding to any one of the spindles 81—83 is turnably supported by any eye 113 which is fixed to the carriage and which prevents translational movement of the spindle 111 with respect to the carriage 110. A nut 112 is fixed on the base of the machine and is in threaded engagement with the spindle so that when the latter is rotated through any suitable drive means, such as one of those shown in Fig. 6, the carriage 110 will be moved along the base.

A pair of shafts 122 are turnably mounted for rotation about their axes on the base 114 and are provided with cut outs into which the pressure members 25 and 26 respectively extend. Pins 125 are mounted in these shafts 122 to engage the pressure members 25 and 26, respectively. The shafts 122 each have a depending portion 123 of reduced diameter which extends through an opening in a member 118 corresponding to members 18, and these members 118 are pinned to portions 123 of shaft 122 to rotate the latter when the members 118 are turned, these members 118 being connected to the parts 16, 17, 19 and 20 in the same way as was described above, so that the members 118 may be turned in the direction of arrows A to cause the pressure members 25 and 26 to be pressed against or released from the strip 116 to respectively lock and release the carriage 110.

Instead of the above-described hydraulic releasable locking means it is possible to provide very strong springs for pressing the members 25 and 26 against the strip 116 and to pull these springs away from their pressing relationship with respect to members 25 and 26 through the medium of electromagnets which may be energized to release only that one of the carriages which is to be moved.

It will be understood that each of the elements described above, or two or more together, may also find a useful application in other types of machine tools differing from the types described above.

While the invention has been illustrated and described as embodied in control apparatus for machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, a carriage; guide means for said carriage; pressure means operatively connected to said guide means and being movable between a pressing position pressing against said guide means to lock said carriage guided thereby and a release position releasing said guide means and freeing said carriage for movement therealong; hydraulic moving means operatively connected to said pressure means for moving the same between said pressing and release positions thereof; and control means operatively connected to said moving means for controlling the operation thereof; a valve for controlling the flow of fluid to said hydraulic moving means, a pivoted member operatively connected to said valve to operate said valve to control the flow of fluid to said hydraulic moving means so as to operate said pressure means between said pressing and release positions; manually operated means independent of said hydraulic moving means for operating said pivoted member, said manually operating means being movable between an inoperative position and an operative position so that said guide means may be released at any time; locking means for locking said manually operated means in said operative position; and releasing means for releasing said locking means, said releasing means being operated by said pressure means in time lag with said pivoted member.

2. In a machine tool, in combination, a carriage; guide means for said carriage; linkage means operatively connected to said guide means and being movable between a pressing position pressing against said guide means to lock said carriage guided thereby and a release position releasing said guide means and freeing said carriage for movement therealong; hydraulic moving means operatively connected to said linkage means for moving the same between said pressing and release positions thereof; and control means operatively connected to said moving means for controlling the operation thereof; a valve for controlling the flow of fluid to said hydraulic moving means, a pivoted member operatively connected to said valve to operate said valve to control the flow of fluid to said hydraulic moving means so as to operate said linkage means; a motor to operate said carriage in said guided means, slip coupling means between said motor and said carriage, a switching means for said motor; a manually operated means independent of said hydraulic moving means, said manually operated means operating said pivoted member and said switching means respectively, said manually operated means being movable between an inoperative position and an operative position, said switching means being closed in said operative position to start the motor so that the carriage locked by said pressure means causes slipping of said clutch during operation of the motor; locking means for locking said manually operated means in said operative position; and releasing means operated by said pressure means to release said locking means when said pressure means moves to said release position, said switching means being operated simultaneously with the operation of said pivoted member operating said valve.

3. In a machine tool, in combination, a carriage; a motor to operate said carriage; guide means for said carriage; linkage means operatively connected to said guide means and being movable between a pressing position pressing against said guide means to lock said carriage guided thereby and a release position releasing said guide means and freeing said carriage for movement therealong; hydraulic moving means operatively connected to said linkage means for moving the same between said pressing and release positions thereof; and control means operatively connected to said moving means for controlling the operation thereof, said control means comprising a slide valve for controlling the flow of fluid to and from said hydraulic moving means, a pivoted member bell crank operatively connected to said slide valve for moving same, and a cam member operatively connected to said pivoted member for moving the same to operate said slide valve and control the flow of fluid through said hydraulic moving means so as to move said linkage means to said pressing or release position thereof.

4. In a machine tool, in combination, a carriage having a slip coupling; a motor to operate said coupling; guide means for said carriage; linkage means operatively connected to said guide means and being movable between a pressing position pressing against said guide means to lock said carriage guided thereby and a release position releasing said guide means and freeing said carriage for movement therealong; hydraulic moving means operatively connected to said linkage means for moving the same between said pressing and release positions thereof; and control means operatively connected to said moving means for controlling the operation thereof, said control means comprising a slide valve for controlling the flow of fluid to and from said hydraulic moving means, a pivoted member operatively connected to said slide valve for moving same, and a cam-shaped member operatively connected to said pivoted member for moving the same to operate said slide valve and control the flow of fluid through said hydraulic moving means so as to move said linkage means to said pressing or release position thereof, a switch means to start said motor to drive said coupling and a control member for controlling the movement of said carriage and said switching means, said control member being connected to said pivoted member for moving the latter to the position which releases said linkage means before said control member is located at the position which starts the operation of said motor to move said carriage.

5. In a machine tool, in combination; a carriage; guide means for said carriage; linkage means operatively connected to said guide means and being movable between a pressing position pressing against said guide means to lock said carriage guided thereby and a release position releasing said guide means and freeing said carriage for movement therealong; hydraulic moving means operatively connected to said linkage means for moving the same between said pressing and release positions thereof; control means operatively connected to said moving means for controlling the operation thereof, said control means comprising a slide valve for controlling the flow of fluid to and from said hydraulic moving means, a pivoted member operatively connected to said slide valve for moving same, and a cam-shaped member operatively connected to said pivoted member for moving the same to operate said slide valve and control the flow of fluid through said hydraulic moving means so as to move said linkage means to said pressing or release position thereof, and a control member for controlling the movement of said carriage, said control member being connected to said cam for turning the latter to the position which releases said linkage means before said control member is located at the position which starts the movement of the carriage; releasable limiting means operatively connected to said cam for limiting the turning movement thereof to an angle only sufficient to turn said pivoted member for releasing said linkage means; and release means operatively connected to said hydraulic moving means and said limiting means for releasing the latter only when said hydraulic moving means has moved said linkage means to said release position thereof.

6. In a machine tool, in combination; a carriage; guide means for said carriage; linkage means operatively connected to said guide means and being movable between a pressing position pressing against said guide means to lock a carriage guided thereby and said release position releasing said guide means and freeing said carriage for movement therealong; a piston connected to said linkage means for moving the latter between said positions thereof; a cylinder supporting said piston for reciprocating movement; fluid guiding means operatively connected to said cylinder for guiding the fluid to opposite sides of said piston for reciprocating the same to move said linkage means; valve means operatively connected to said fluid guiding means for controlling the direction of fluid flow therein so as to control the movement of said piston; a pivoted member connected to said valve means for actuating the same, said lever having a projecting portion; a cam-shaped member having a notch in which said projecting portion of said pivoted member is located when said valve means is in the position where said piston holds said linkage means in said pressing position thereof; and a spring operatively connected to said lever for urging said projection thereof into said notch of said cam-shaped member; manually operated means independent of said linkage means, said manually operated means moving said pivoted member, and being movable between an inoperative position and an operative position so that said guide means may be released by said linkage means at any time; locking means for locking said manually operated means in said operative position; and releasing means for releasing said locking means, said releasing means being operated by said pressure means in time lag with said pivoted member.

7. In a machine tool, in combination, guide means for a carriage of a machine tool; linkage means operatively connected to said guide means and being movable between a pressing position pressing against said guide means to lock a carriage guided thereby and a release position releasing said guide means and freeing a carriage for movement therealong; hydraulic moving means operatively connected to said linkage means for moving the same between said pressing and release positions thereof; control means operatively connected to said moving means for controlling the operation thereof, said control means comprising a slide valve for controlling the flow of fluid to and from said hydraulic moving means, a bell crank operatively connected to said slide valve for moving same, and a cam operatively connected to said bell crank for turning the same to operate said slide valve and control the flow of fluid through said hydraulic moving means so as to move said linkage means to said pressing or release position thereof; and manual turning means independent of said control means operatively connected to said bell crank for turning the latter independently of said control means so that said guide means may be manually released at any time.

8. In a machine tool, in combination, guide means for a carriage of a machine tool; linkage means operatively connected to said guide means and being movable between a pressing position pressing against said guide means to lock a carriage guided thereby and a release position releasing said guide means and freeing a carriage for movement therealong; a piston connected to said linkage means for moving the latter between said positions thereof; a cylinder supporting said piston for reciprocating movement; fluid guiding means operatively connected to said cylinder for guiding the fluid to opposite sides of said piston for reciprocating the same to move said linkage means; valve means operatively connected to said fluid guiding means for controlling the direction of fluid flow therein so as to control the movement of said piston; a lever connected to said valve for actuating the same, said lever having a projecting portion; a cam having a notch in which said projecting portion of said lever is located when said valve is in the position where said piston holds said linkage means in said pressing position thereof and said cam having a second notch spaced from said first-mentioned notch; a spring operatively connected to said lever for urging said projection thereof into said first-mentioned notch of said cam; a pawl located in said second notch of said cam for limiting the turning movement thereof; a pin fixed to a part of said piston for movement therewith; and turning means operatively connected to said cam for turning the latter out of said second notch, said turning means being located in the path of movement of said pin to be engaged by the latter and actuated to turn said pawl out of said second notch only when said piston has moved said linkage means to said release position thereof.

9. In a machine tool, in combination, a plurality of guide means for guiding a plurality of carriages; a plurality of linkage means operatively connected to said plurality of guide means, respectively, and being movable between a pressing position respectively pressing against said plurality of guide means to lock a plurality of carriages respectively guided thereby and a release position respectively releasing said plurality of guide means for freeing carriages respectively guided thereby for movement therealong; a plurality of hydraulic moving means operatively connected to said plurality of linkage means, respectively, for respectively moving the same between said pressing and release positions thereof; and a single control means operatively connected to said plurality of hydraulic moving means for actuating only one of the latter at any one time to release the linkage means connected thereto.

10. In a machine tool, in combination, a plurality of guide means for guiding a plurality of carriages; a plurality of linkage means operatively connected to said plurality of guide means, respectively, and being movable between a pressing position respectively pressing against said plurality of guide means to lock a plurality of carriages respectively guided thereby and a release position respectively releasing said plurality of guide means for freeing carriages respectively guided thereby for movement therealong; a plurality of hydraulic moving means operatively connected to said plurality of linkage means, respectively, for respectively moving the same between said pressing and release positions thereof; and a single control means operatively connected to said plurality of hydraulic moving means for actuating only one of the latter at any one time to release the linkage means connected thereto and said control means having a position where said plurality of moving means simultaneously hold all of said linkage means in said pressing positions thereof.

11. In a machine tool, in combination, a plurality of guide means for guiding a plurality of carriages; a plurality of linkage means operatively connected to said plurality of guide means, respectively, and being movable between a pressing position respectively pressing against said plurality of guide means to lock a plurality of carriages respectively guided thereby and a release position respectively releasing said plurality of guide means for freeing carriages respectively guided thereby for movement therealong; a plurality of hydraulic moving means operatively connected to said plurality of linkage means, respectively, for respectively moving the same between said pressing and release positions thereof; a single control means operatively connected to said plurality of hydraulic moving means for actuating only one of the latter at any one time to release the linkage means connected thereto; and independent actuating means entirely separate from said control means operatively connected to at least one of said moving means for independently actuating the latter to move the linkage means connected thereto to the release position thereof.

12. In a machine tool, in combination, a plurality of guides for respectively guiding a plurality of carriages in a plurality of different directions, respectively; a plurality of releasable lock means engaging said plurality of guides, respectively, for releasably locking carriages mounted on said guides for movement therealong; operating means movable to a plurality of different positions for respectively setting into operation mechanisms for moving said carriages, respectively; and control means operatively connected to said plurality of releasable locking means for releasing only that one of the carriages which is to be moved when said operating means is located in a particular one of its positions.

13. In a machine tool as defined in claim 12, and wherein a single operating member forms part of said operating means and control means to release only that one of said carriages which is to be moved when said operating member is moved to locate said operating means in a particular one of its positions.

14. In a machine tool as defined in claim 12, and wherein a first operating member forms part of said operating means to move the latter to said plurality of different positions and a second operating member forms part of said control means for releasing only that one of the carriages which is to be moved when said operating means is located in a particular one of its positions.

15. In a machine tool, in combination, a carriage; a feeding mechanism to move said carriage; a motor for operating said feeding mechanism; a slip coupling connecting said motor to said feeding mechanism guide means for said carriage; pressure means operatively connected to said guide means and movable between a pressing position pressing against said guide means to lock said carriage guided thereby and a release position releasing said guide means to free said carriage for movement therealong; hydraulic moving means operatively connected to said pressure means for moving the same between said pressing and release positions thereof; feed control means movable to and from an operative position where said motor means is connected to the carriage by means of said slip coupling for feeding the same; and control means operatively connected to said hydraulic moving means for operating the same to release said pressure means from said guide means before said feed control means can be moved to said operative position thereof whereby the carriage cannot be moved by said motor means until said pressure means is released.

16. In a machine tool, in combination, a carriage; a feeding mechanism to move said carriage, a motor for operating said feeding mechanism; a slip coupling connecting said motor to said feeding mechanism guide means for said carriage; pressure means operatively connected to said guide means and movable between a pressing position pressing against said guide means to lock said carriage guided thereby and a release position releasing said guide means to free said carriage for movement therealong; hydraulic moving means operatively connected to said pressure means for moving the same between said pressing and release positions thereof; and control means movable to a feed position for setting into operation said feeding mechanism, said control means being operatively connected to said hydraulic moving means for operating the same to move said pressure means to said release position thereof during movement of said control means to said feed position thereof and before said control means reaches said feed position so that the carriage is released before the feeding mechanism therefor can be set into operation.

References Cited in the file of this patent

UNITED STATES PATENTS

| Number | Name | Date |
|---|---|---|
| 314,650 | Campbell | Mar. 31, 1885 |
| 1,140,481 | Rank | May 25, 1915 |
| 1,195,614 | Sheedy | Aug. 22, 1916 |
| 1,364,882 | Koken | Jan. 11, 1921 |
| 1,479,440 | Abele | Jan. 1, 1924 |
| 1,588,364 | Haskell | June 8, 1926 |
| 1,824,866 | Bristol | Sept. 29, 1931 |
| 2,022,646 | Belden | Dec. 3, 1935 |
| 2,366,398 | Harrington | Jan. 2, 1945 |
| 2,466,198 | Berthiez | Apr. 5, 1949 |
| 2,477,490 | Martin | July 26, 1949 |